United States Patent

Billings

[15] 3,691,247
[45] Sept. 12, 1972

[54] SELECTIVELY REMOVING MONOALKYLBENZENES FROM MIXTURES THEREOF WITH DIALKYLBENZENES

[72] Inventor: William G. Billings, Bartlesville, Okla.

[73] Assignee: Phillips Petroleum Company

[22] Filed: Sept. 28, 1970

[21] Appl. No.: 76,074

[52] U.S. Cl. ........260/674 A, 260/668 A, 260/672 R
[51] Int. Cl. ...........................C07c 7/02, C07c 3/58
[58] Field of Search ...........260/674 A, 672 R, 668 A

[56] References Cited

UNITED STATES PATENTS 2,564,388   8/1951   Bennett et al. ............260/672
2,963,518   12/1960  Amos et al.................260/672
2,890,252   6/1959   Cottle........................260/674

Primary Examiner—Delbert E. Gantz
Assistant Examiner—C. E. Spresser
Attorney—Young and Quigg

[57] ABSTRACT

Monoalkylbenzenes, e.g., ethylbenzene, contained in a mixture with dialkylbenzenes, e.g., one or more xylenes, are selectively removed from said mixture by steam reforming the mixture so as to convert the monoalkylbenzene to lower boiling materials, e.g., benzene and/or toluene, which can be readily removed from the mixture.

20 Claims, 1 Drawing Figure

PATENTED SEP 12 1972 3,691,247
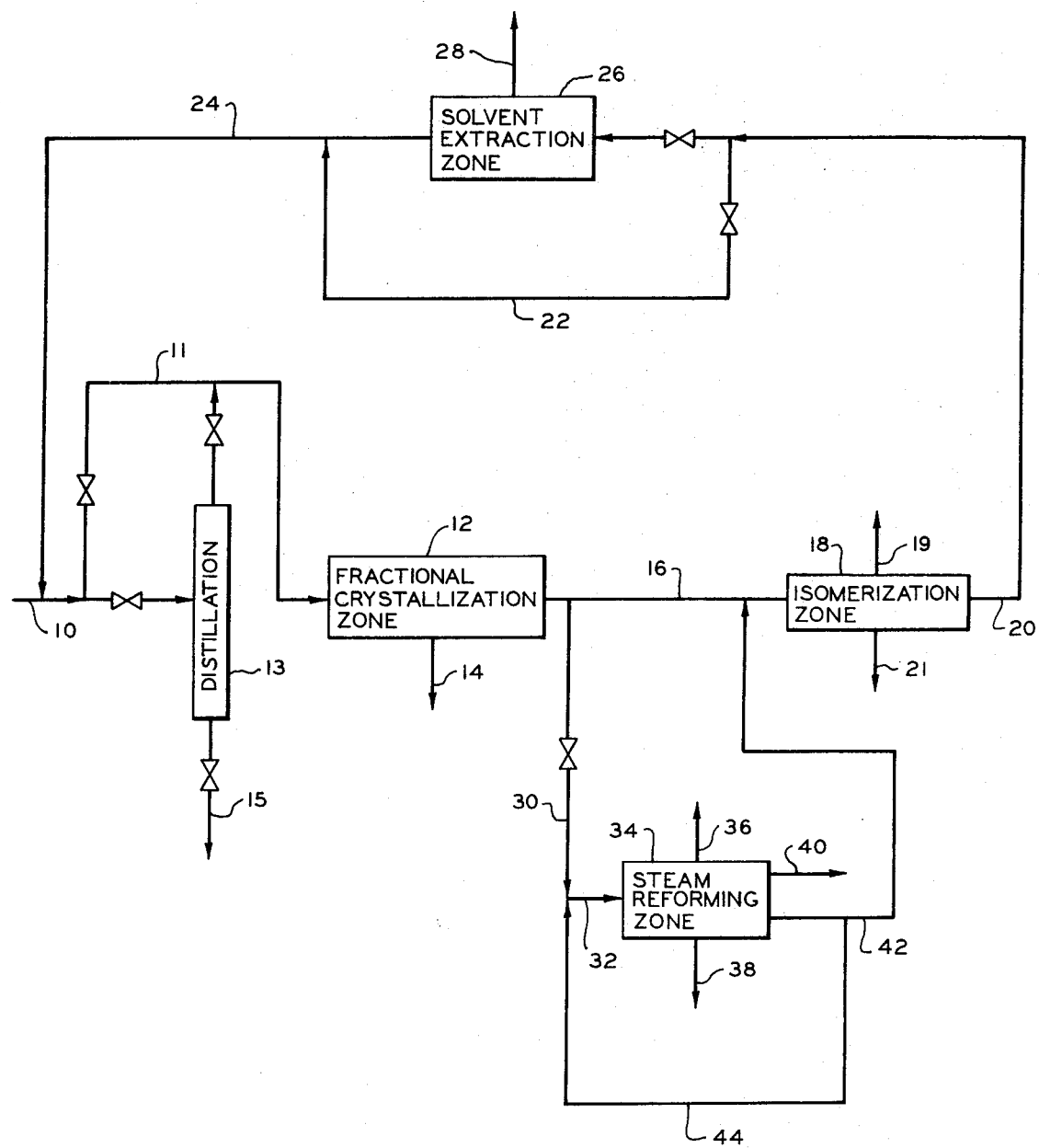
INVENTOR.
W. G. BILLINGS
BY Young and Quigg
ATTORNEYS

SELECTIVELY REMOVING MONOALKYLBENZENES FROM MIXTURES THEREOF WITH DIALKYLBENZENES

This invention relates to selectively removing monoalkylbenzenes from mixtures thereof with dialkylbenzenes.

The xylenes, o-xylene, m-xylene, and p-xylene, along with their isomer ethylbenzene, are important and widely used chemicals. For example, p-xylene can be oxidized to terephthalic acid which is used in the manufacture of synthetic textiles. o-Xylene is a starting material for the production of phthalic anhydride. m-Xylene is used in the manufacture of plasticizers, azo dyes, with preservatives, etc. Ethylbenzene is a starting material for the preparation of styrene.

Mixtures of said xylenes and ethylbenzene are obtained from petroleum processing operations, such as catalytic cracking and the like, and also from coal tar fractions. Mixtures of said xylenes and ethylbenzene are not necessarily equilibrium mixtures. However, because of the close boiling points, it is difficult to separate these components in pure form by fractional distillation. This is particularly true when it is desired to produce higher concentrations of a particular xylene.

For example, it is frequently desirable to produce p-xylene in increased amounts. It is known that p-xylene can be separated from the other xylenes and ethylbenzene by fractional crystallization. It is also known that o-xylene and m-xylene can be isomerized to form p-xylene. Thus, processes have been proposed which comprise subjecting a mixture of said xylene isomers to fractional crystallization to separate p-xylene therefrom, isomerizing the mother liquor from the fractional crystallization unit to convert at least a portion of the ortho and/or meta isomers to the paraisomer, and then returning the isomerate to the fractional crystallization unit to separate at least a portion of the p-xylene therefrom. If desired, such processes can be modified to separate o-xylene by fractional distillation prior to feeding the mixture to the fractional crystallization unit. Such processes provide a convenient method for producing p-xylene in increased amounts.

There will usually be some ethylbenzene present in the mother liquor from the fractional crystallization unit, and in the isomerate. The amount of said ethylbenzene so present will depend to some extent, at least, on the amount of ethylbenzene present in the feed stream, and upon the type of catalyst and the operating conditions employed in the isomerization zone. Thus, there can be an amount in the order of 5 percent to an amount in the order of 15 to 20 percent of ethylbenzene circulating in the system at all times. This is undesirable since it reduces the capacity of the system and increases operating costs. Certain xylene isomerization catalysts have little or no isomerization activity with respect to ethylbenzene and therefore this invention is particularly useful in combination with such a process. The invention thus provides a means of preventing the concentration of ethylbenzene from increasing to undesirable levels.

The present invention provides a solution for the above problem. I have now discovered that the concentration of monoalkylbenzenes, present in a mixture which also contains at least one dialkylbenzene, can be reduced by selectively converting said monoalkylbenzene to lower boiling materials without converting an appreciable amount of said dialkylbenzene. Said lower boiling materials can then be readily separated from the resulting reaction mixture. The invention is particularly applicable to mixtures wherein the monoalkyl benzene(s) is an isomer of the dialkylbenzene(s), e.g., a mixture containing ethylbenzene and one or more of the xylenes.

Thus, according to the invention, there is provided a process for reducing the concentration of a monoalkylbenzene in a mixture containing same together with at least one dialkylbenzene, which process comprises: contacting said mixture with steam under reaction conditions including a steam to aromatic weight ratio and a temperature sufficient to, and in the presence of a catalyst active for, selectively convert at least a portion of said monoalkylbenzene to lower boiling materials.

Further according to the invention, there is provided a process for the production of p-xylene, which process comprises, in combination, the steps of: (a) chilling a xylene concentrate comprising p-xylene, at least one other xylene, and ethylbenzene in a fractional crystallization zone so as to crystallize p-xylene from said concentrate; (b) isomerizing a portion of the mother liquor from said fractional crystallization zone in an isomerization zone under isomerization conditions and in the presence of a catalyst active for producing p-xylene so as to convert at least a portion of said other xylene to p-xylene; (c) returning an effluent stream having an increased p-xylene concentration from said isomerization zone to said fractional crystallization zone; (d) steam reforming another portion of said mother liquor from said fractional crystallization zone by contacting same in a steam reforming zone under reaction conditions including a steam to aromatics weight ratio and a temperature sufficient to, and in the presence of a catalyst active for, selectively convert at least a portion of said ethylbenzene to lower boiling materials; (e) separating said lower boiling materials from the effluent from said steam reforming zone; (f) passing said thus purified steam reforming zone effluent to said isomerization zone; and (g) recovering p-xylene from said fractional crystallization zone.

Feedstocks applicable for use in the practice of the invention are mixtures comprising at least one monoalkylbenzene wherein the alkyl group contains from two to 10 carbon atoms per molecule, and at least one dialkylbenzene wherein each alkyl group contains from one to 10 carbon atoms per molecule. One presently preferred feedstock comprises a mixture of ethylbenzene and one or more xylenes, preferably o-xylene and/or m-xylene.

Examples of said monoalkylbenzenes which can be in the feedstocks of the invention include, among others, the following: ethylbenzene, n-propylbenzene, sec-amylbenzene, 2-methylnonylbenzene, 3-ethylhexylbenzene, n-decylbenzene, and 2,4-dimethylheptylbenzene. Examples of said dialkylbenzenes which can be present in the feedstocks used in the practice of the invention include, among others, the following: o-xylene, m-xylene p-xylene, 1,3-diethylbenzene, 1,4-di-n-propylbenzene, 1,2-di-n-amylbenzene, 1,4-di(2-methylbutyl)benzene, 1,3-di-n-decylbenzene, 1,4-di(3-ethylheptyl)-benzene, 1-methyl-4-hexylbenzene, 1-ethyl-3-n-butylbenzene, 1-n-octyl-2-sec-amylbenzene.

The operating conditions employed in the steam reforming step of the invention can vary appreciably. Any suitable conditions effective for selectively converting a monoalkylbenzene, contained in a mixture with a dialkylbenzene, to lower boiling materials can be employed in the practice of the invention. Preferably, the reforming temperature will be in the range of from about 700° F. to about 1100° F., more preferably in the range of from about 800° F. to about 1,000° F. The pressure can be in the range of from atmospheric to about 300 psig. However, higher pressures can be employed. The steam to hydrocarbon (aromatics) weight ratio can be in the range of from 1 to 5. The space velocity, expressed on a liquid basis for convenience, can be in the range of from 1.5 to 15, preferably about 2.5 to 5 volumes of total aromatics per volume of catalyst per hour.

Any suitable catalyst which is active for selectively converting a monoalkylbenzene, contained in a mixture with at least one dialkylbenzene, to lower boiling materials in the presence of steam can be employed in the practice of the invention. One presently preferred catalyst comprises a supported nickel catalyst promoted with a barium salt of an organic acid such as barium acetate. Preferably, the support for the nickel catalyst comprises an aluminum-containing support material such as alumina or calcium aluminate. Said nickel catalyst prior to impregnation with the barium salt can be either nonreduced or reduced and stabilized to prevent reaction with the oxygen in the air. Said catalyst is preferably a supported nickel catalyst such as nickel-alumina-containing material containing 5 to 90 weight percent nickel on a reduced basis and 1 to 10 weight percent barium salt. Said nickel catalyst exhibits a considerably longer catalyst life than is obtained with other prior art promoted nickel catalysts.

Instead of alumina, other natural or synthetic refractory base material supports, such as silica, zirconia, thoria, beryllia, boria, magnesia, titania, binary combinations thereof such as silica-alumina, silica-magnesia, boria-alumina, magnesia-alumina, beryllia-titania, and the like, and ternary combinations thereof, such as silica-alumina-thoria, silica-magnesia-zirconia, alumina-beryllia-titania, and the like; naturally occurring supports such as kieselguhr, diatomaceous earth, fuller's earth, perlite, and the like; Group II aluminate spinels and mixtures thereof, including mixtures of spinels and excess Group II metal oxide or spinels and excess alumina, such as calcium aluminate, zinc aluminate, magnesium aluminate, barium aluminate, beryllium aluminate, strontium aluminate, and the like; natural or synthetic crystalline alumino-silicates such as levynite, erionite, faujasite, analcite, noselite, heulandite, stilbite, phillipsite, brewsterite, datolite, chabazite, leucite, scapolite, mordenite, sodalite, calcium aluminosilicate, barium aluminosilicate, and the like, can be used.

Other alumina-containing supports can also be used. By alumina-containing is meant a compound containing $Al_2O_3$. For example, calcium aluminate can be represented by the chemical formula $CaO \cdot Al_2O_3$, calcium aluminosilicate by $CaO \cdot Al_2O_3 \cdot 2SiO_2$, and aluminum silicate by $Al_2O_3 \cdot SiO_2$ and $3Al_2O_3 \cdot 2SiO_2$.

The catalyst can be prepared by any of the procedures known to the industry, such as by impregnation of the support with aqueous or nonaqueous solutions of the active ingredients, coprecipitation of the active and support ingredients, physical mixing, and the like. The barium promoter can be added before, during, or after the addition of the nickel to the support, and can be added in the form of any salt of an organic acid or hydroxy-substituted organic acid that is soluble in water or an organic solvent. Any suitable nickel salt, such as nickel acetate, nickel nitrate, and the like, can be used. Examples of barium salts that can be used are the formate, acetate, propionate, butyrate, caproate, malate, gluconate, benzoate, salicylate, mandelate, cinnamate, and the like. A presently preferred method for preparing said preferred catalyst is to precipitate a basic nickel carbonate in the presence of a support such as alumina, filter, dry, impregnate with a solution of a barium salt of an organic acid, and dry. For use in fixed-bed operation, the catalyst can be granulated or pelleted at any suitable point during the preparation, such as after the formation of the nickel-support mixture or after the formation of barium-nickel-support mixture. For use in fluidized-bed operation such granulation or pelleting is unnecessary. As indicated above, the nickel component of the catalyst can be reduced and stabilized to prevent reaction with the oxygen in the air at any point subsequent to the addition of the nickel. Such reduction and stabilization permits loading the catalyst into the reactor and using it without a reduction step. However, it is within the scope of the invention to reduce the catalyst with hydrogen or a hydrogen-containing gas after it is in the reactor.

Further details regarding the preparation of said preferred catalyst can be found in copending application Ser. No. 647,935 filed June 22, 1967, now U.S. Pat. No. 3,522,024.

Another catalyst which can be employed in the steam reforming step of the invention comprises a supported chromate, tungstate, or molybdate of the iron group metals, including iron, cobalt, and nickel, promoted with a barium salt of an organic acid such as barium acetate. Preferably, the support for the catalyst comprises an aluminum-containing support material such as alumina or calcium aluminate. The catalyst will ordinarily contain from 1 to 10 weight percent of the iron group metal and from 5 to 25 weight percent of the chromate, tungstate, or molybdate, calculated as the oxide, i.e., $CrO_3$, $WO_3$, or $MoO_3$. The remainder of the catalyst is comprised of support material, such as alumina or other aluminum-containing material. Further details regarding the preparation of said catalyst can be found in my U. S. Pat. No. 3,506,418, issued Apr. 14, 1970.

The drawing is a diagrammatic flow sheet illustrating a combination process of the invention for reducing the concentration of ethylbenzene contained in a mixture of said ethylbenzene and at least one xylene, preferably o-xylene and/or m-xylene.

Referring now to the drawing, the invention will be more fully explained. Feedstocks used in the practice of the invention can be obtained from any convenient source. Suitable feedstocks comprising xylene isomers can be obtained by conventional processes such as catalytic reforming of petroleum naphthas, preferably naphthas from naphthenic crudes. Such reforming processes generally involve a number of simultaneously occurring reactions such as cracking, aromatization, dehydrocyclization, and dehydrogenation of naphthenes. The effluent from the reformer can be fractionally distilled to recover a fraction of the reformate comprising $C_8H_{10}$ aromatic hydrocarbons which contains ethylbenzene in addition to o-xylene, m-xylene, and p-xylene. Such $C_8H_{10}$ aromatic fractions thus obtained do not necessarily consist of an equilibrium mixture of the different isomers. For example, the mixture can be low or high in the concentration of one or more of the xylenes, or low or high in the concentration of ethylbenzene.

A xylene concentrate fraction comprising a mixture of m-xylene, o-xylene, p-xylene, and ethylbenzene is introduced via conduits 10 and 11 into fractional crystallization zone 12. Said fractional crystallization zone is a conventional process known in the art wherein a xylene-rich fraction is subjected to a temperature in the range of −70° to −115° F. in order to effect separation of essentially pure p-xylene from the other xylene isomers as either a melt or as a predominantly crystalline material or slurry. Fractional crystallization processes which can be used in the practice of the invention are disclosed and claimed in Schmidt U.S. Pat. No. Re. 23,810, Arnold U.S. Pat. No. 2,540,977, and Thomas U.S. Pat. No. 2,854,494. Essentially pure p-xylene is removed from crystallization zone 12 via conduit 14 as a product of the process. The mother liquor containing m- and o-xylenes, ethylbenzene, and a minor amount of p-xylene, is removed from fractional crystallization zone 12 via conduit 16 and a portion thereof introduced into isomerization zone 18. If it is desired to also produce o-xylene as a product of the process, the feedstock in conduit 10 can be passed into distillation zone 13. The o-xylene can be removed as bottoms product via conduit 15. The remainder of the feedstock is passed overhead into conduit 11 for introduction into fractional crystallization zone 12.

Isomerization processes for isomerizing nonequilibrium mixtures of xylene isomers to equilibrium mixtures of said mixtures are known in the art. Isomerization processes for isomerizing o-xylene and m-xylene to p-xylene are also known in the art. Thus, isomerization zone 18 can comprise any of such processes employing any known catalyst and operating conditions which are effective for increasing the concentration of the p-xylene in the portion of the mother liquor charged to the isomerization zone. Generally speaking, temperatures within the range of from about 200° F. to about 1,100° F., or higher, can be employed in said isomerization zone. The pressure in said zone will usually be in the order of about 50 to 1,000 psig, or higher. Said isomerization is usually carried out in the presence of hydrogen which is present in a mol ratio of hydrogen to hydrocarbon charge within the range of 1:1 to 20:1.

One example of a catalyst which can be employed in said isomerization zone is a silica-alumina catalyst which has been impregnated with an aqueous solution of ammonia-molybdenum-containing compound, e.g., ammonium molybdate, and which has been activated by hydrogen treatment at 650° to 850° F. This catalyst will isomerize the xylenes and has limited effect upon the isomerization of ethylbenzene. Another catalyst which can be employed in said isomerization zone is a crystalline zeolitic alumino-silicate having intimately associated therewith cobalt or nickel in the elemental or compound form. Details of the preparation and use of said catalyst can be found in Burnett U.S. Pat. No. 3,390,199, issued June 25, 1968. Another catalyst which can be employed in said isomerization zone is a platinum-alumina-halogen catalyst generally containing from about 0.01 to about 10 percent by weight of platinum and from about 0.5 to about 3 percent by weight of a halogen, preferably chlorine and/or fluorine, on a high surface area alumina support. Details of the preparation and use of said catalyst can be found in Lovell et al. U.S. Pat. No. 3,381,048, issued Apr. 30, 1968. Preferred catalysts for use in the practice of the invention in said isomerization zone are those which tend to increase the rate of formation of p-xylene more than they increase the rates of other competing reactions under the reaction conditions employed.

It will be understood that said isomerization zone 18 includes means for separating from the isomerizate materials which are lower boiling and materials which are higher boiling than the boiling range, e.g., about 275° F. to about 295° F., of a desired xylene concentrate stream. Said lower boiling materials and said higher boiling materials can be removed from isomerization zone 18 via conduits 19 and 21, respectively. A xylene concentrate stream having an increased p-xylene concentration as compared to the feed stream 16 is withdrawn from said isomerization zone via conduit 20 and returned via conduits 22 and 24 to conduit 10 for introduction into said fractional crystallization zone 12. If desired, or necessary, said xylene concentrate stream can be passed through solvent extraction zone 26 for concentration of the aromatics therein. Said solvent extraction zone 26 comprises a conventional solvent extraction zone and any suitable solvent known to the art for selectively extracting aromatics can be employed therein. Nonaromatic materials are removed from said solvent extraction zone via conduit 28. The aromatic concentrate stream can be passed via conduits 24, 10 and 11 to fractional crystallization zone 12.

Another portion of the mother liquor from fractional crystallization zone 12 is passed via conduits 30 and 32 into steam reforming zone 34 for selectively reducing the concentration of the ethylbenzene contained therein. The fraction of the effluent stream from zone 12 which is passed to zone 34 via line 30 and 32 will depend of course on the concentration of the ethylbenzene in said stream, the concentration level of ethylbenzene which is to be maintained in system, the degree of conversion in the reforming step, etc. This amount can be determined readily by one skilled in the art and will be that amount which will provide the desired conversion of ethylbenzene. In most instances this desired result can be accomplished by passing from 5 to 95 weight percent of the effluent from zone 12 to the reforming zone 34. Suitable catalysts and operating conditions for said steam reforming zone have been described above, and are illustrated further in the examples given hereinafter. Gases formed during the reforming process are withdrawn via conduit 36. Any small amount of higher boiling materials which may be formed during the steam reforming process can be withdrawn from said steam reforming zone 34 via conduit 38. The lower boiling conversion products of the process, e.g., benzene and toluene, can be withdrawn from said steam reforming zone via conduit 40. An effluent stream having a reduced concentration of ethylbenzene is withdrawn from said steam reforming zone 34 via conduit 42 and passed to said isomerization zone 18. As shown by the examples given hereinafter, it is generally desirable to operate said steam reforming step with a low conversion per pass. Thus, a portion of the effluent stream in conduit 42 can be recycled via conduit 44 to conduit 32 for reintroduction as a portion of the feedstock to the steam reforming zone. The amount of recycle will depend on several factors, including the extent of conversion of ethylbenzene in the reformer per pass. Said recycle can range up to 50 weight percent of effluent from said steam reformer, and can be determined readily by one skilled in the art.

Generally speaking, the catalysts employed in said steam reforming zone can be sulfur sensitive or sulfur insensitive. When a sulfur sensitive catalyst is employed which cannot be used in sulfided form with sulfur-containing feedstocks, it is within the scope of the invention to treat the hydrocarbon feedstock prior to said steam reforming zone so as to remove sulfur-containing materials from said feedstock. Thus, in an optional procedure, the hydrocarbon feedstock can be first passed through a guard chamber bed containing molecular sieve and then through a second guard chamber bed containing zinc oxide. Further details concerning the use of said guard chambers can be found in Billings U.S. Pat. No. 3,506,418, issued Apr. 14, 1970.

The following examples will serve to further illustrate the invention.

EXAMPLES

A series of runs was made to demonstrate the steam reforming step of the invention. The catalyst employed in said runs was prepared by impregnating ⅛-inch nickel-calcium aluminate pellets (Girdler G–65RS) with an aqueous solution of barium acetate. The catalyst employed contained 24 weight percent nickel, 2.7 weight percent barium, 3.0 weight percent calcium, and 27.7 weight percent aluminum. Said catalyst was placed in a tubular reactor fabricated of stainless steel. A feedstock consisting of 79.1 mol percent m-xylene and 20.9 mol percent ethylbenzene was then passed over the catalyst under various operating conditions as set forth below. The composition of the reactor effluent streams was determined by gas-liquid chromatography. Operating conditions and results of said runs are set forth in Table I below.

TABLE I

| | Run Number | | | |
|---|---|---|---|---|
| | 1 | 2 | 3 | 4 |
| Reaction Conditions | | | | |
| Temperature, °F. | 890 | 890 | 920 | 930 |
| Pressure, psig | 260 | 180 | 100 | 40 |
| LHSV, aromatics | 2.14 | 2.64 | 2.64 | 3.5 |
| Steam/aromatic wt. ratio | 2.0 | 1.75 | 1.62 | 1.3 |
| Conversion | | | | |
| Meta xylene, % | 16.8 | 6.32 | 5.8 | 3.54 |
| Ethyl benzene, % | 35.8 | 21.6 | 25.8 | 18.2 |
| Total | 52.6 | 27.9 | 31.6 | 21.74 |
| Selectivity of conversion, ethylbenzene over m-xylene | 2.13 | 3.41 | 4.45 | 5.13 |
| Selectivity to Aromatics | 58 | 58.5 | 60.8 | 57.5 |
| Reactor Effluent Liquid Phase — mol % | | | | |
| Meta xylene | 65.5 | 76.3 | 76.5 | 77.8 |
| Ethyl benzene | 13.3 | 16.8 | 16.1 | 17.6 |
| Toluene | 9.45 | 4.44 | 4.75 | 2.6 |
| Benzene | 4.97 | 2.43 | 2.62 | 1.9 |
| Reactor Effluent Gas Phase — mol % | | | | |
| $H_2$ | 65.5 | 68.3 | 67.4 | 67.8 |
| $CO_2$ | 31.3 | 30.8 | 32.3 | 31.5 |
| CO | 0.8 | 0.7 | trace | Trace |
| $CH_4$ | 2.7 | 0.24 | trace | Trace |

A comparison of the data in the above Table I shows that in all of the runs the reaction was more selective to the conversion of ethylbenzene as compared to the conversion of m-xylene. Said data also show that the higher flow rates, the lower steam to aromatic ratios, and the higher temperatures increased the selectivity of the conversion of ethylbenzene over m-xylene. For example, in Run No. 4 the selectivity to conversion of ethylbenzene was 5.13 as compared to 2.13 for m-xylene. In Run No. 4 the actual effective conversion of ethylbenzene is five times greater than the conversion of m-xylene. Since the feedstock contained five times as much m-xylene as ethylbenzene, the reaction is 25 times more selective toward the conversion of ethylbenzene than toward the conversion of m-xylene, on a mol basis. However, a reaction site basis, the xylene contains two reaction sites as compared to only one for the ethylbenzene. Therefore, on a reaction site basis, it can be said that the reaction is 50 times more selective for the conversion of ethylbenzene than for the conversion of m-xylene.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for reducing the concentration of a monoalkyl benzene in a mixture containing same together with at least one dialkyl benzene, which process comprises contacting said mixture with steam under reaction conditions including a steam to aromatic weight ratio and a temperature within the range 700° to 1100° F. and in the presence of a catalyst comprising (a) a supported chromate, tungstate, or molybdate of iron oxide group metals treated with a barium salt of an organic acid or (b) a supported nickel catalyst treated with a barium salt of an organic acid to selectively convert at least a portion of said monoalkyl benzene to lower boiling materials.

2. A process according to claim 1 wherein:
said steam to aromatics weight ratio is within the range of from 1 to 5;
said temperature is within the range of from 700° to 1,100° F.; and
said contacting is effected at a space velocity, expressed on a liquid basis, within the range of from 1.5 to 15 volumes of said aromatics per volume of said catalyst per hour.

3. A process according to claim 2 wherein the alkyl group in said monoalkyl benzene contains from two to 10 carbon atoms, and each of the alkyl groups in said dialkyl benzene contains from one to 10 carbon atoms.

4. A process according to claim 3 wherein said dialkyl benzene is an isomer of said monoalkyl benzene.

5. A process according to claim 4 wherein said monoalkyl benzene comprises ethyl benzene and said dialkyl benzene comprises a xylene selected from the group consisting of o-xylene, m-xylene, and p-xylene and mixtures thereof.

6. A process according to claim 1 wherein said catalyst is a supported nickel catalyst treated with a barium salt of an organic acid.

7. A process for reducing the concentration of a monoalkyl benzene in a mixture containing same together with at least one dialkyl benzene, which process comprises contacting said mixture with steam under reaction conditions including a steam to aromatic weight ratio within the range of from 1 to 5 and a temperature within the range of from 700° to 1,100° F. and in the presence of a catalyst comprising supported nickel treated with a barium salt of an organic acid to selectively convert at least a portion of said monoalkyl benzene to lower boiling materials, said contacting being effected at a space velocity, expressed on a liquid basis, within the range of from 1.5 to 15 volumes of said aromatics per volume of said catalyst per hour.

8. A process according to claim 7 wherein said treated catalyst contains from 5 to 90 weight percent nickel and from 1 to 10 weight percent barium salt.

9. A process according to claim 8 wherein the support in said catalyst is a refractory material.

10. A process according to claim 9 wherein said support is calcium aluminate and said barium salt is barium acetate.

11. A process according to claim 10 wherein the alkyl group in said monoalkyl benzene contains from two to 10 carbon atoms, and each of the alkyl groups in said dialkyl benzene contains from one to 10 carbon atoms.

12. A process according to claim 11 wherein said dialkyl benzene is an isomer of said monoalkyl benzene.

13. A process according to claim 12 wherein:
said monoalkyl benzene comprises ethyl benzene;
said dialkyl benzene comprises m-xylene;
said lower boiling materials include benzene and toluene; and
said lower boiling materials are removed from the resulting reaction mixture.

14. A process for the production of p-xylene, which process comprises, in combination, the steps of:
 a. chilling a xylene concentrate comprising p-xylene, at least one other xylene, and ethyl benzene in a fractional crystallization zone so as to crystallize p-xylene from said concentrate;
 b. isomerizing a portion of the mother liquor from said fractional crystallization zone in an isomerization zone under isomerization conditions and in the presence of a catalyst active for producing p-xylene so as to convert at least a portion of said other xylene to p-xylene;
 c. returning an effluent stream having an increased p-xylene concentration from said isomerization zone to said fractional crystallization zone;
 d. steam reforming another portion of said mother liquor from said fractional crystallization zone by contacting same in a steam reforming zone under reaction conditions including a steam to aromatics weight ratio and a temperature sufficient to, and in the presence of a catalyst active for, selectively convert at least a portion of said ethyl benzene to lower boiling materials;
 e. separating said lower boiling materials from the effluent from said steam reforming zone;
 f. passing said thus purified steam reforming zone effluent to said isomerization zone; and
 g. recovering p-xylene from said fractional crystallization zone.

15. A process according to claim 14 wherein a portion of said effluent stream from said steam reforming zone is recycled thereto as feedstock.

16. A process according to claim 14 wherein said effluent stream from said isomerization zone is solvent extracted to increase the aromatic concentration thereof, and is then returned to said fractional crystallization zone.

17. A process according to claim 14 wherein:
said steam to aromatics weight ratio is within the range of from 1 to 5;
said temperature is within the range of from 700° to 1,100° F.; and
said contacting is effected at a space velocity, expressed on a liquid basis, within the range of from 1.5 to 15 volumes of said aromatics per volume of said catalyst per hour.

18. A process according to claim 17 wherein said catalyst is a supported nickel catalyst treated with a barium salt of an organic acid.

19. A process according to claim 18 wherein said treated catalyst contains from 5 to 90 weight percent nickel and from 1 to 10 weight percent barium salt.

20. A process according to claim 19 wherein said support is calcium aluminate and said barium salt is barium acetate.

* * * * *